United States Patent [19]
White

[11] Patent Number: 5,996,067
[45] Date of Patent: *Nov. 30, 1999

[54] RANGE FINDING CIRCUIT FOR SELECTING A CONSECUTIVE SEQUENCE OF REORDER BUFFER ENTRIES USING CIRCULAR CARRY LOOKAHEAD

[75] Inventor: Scott A. White, Austin, Tex.

[73] Assignee: Advanced Micro Devices, Inc., Sunnyvale, Calif.

[*] Notice: This patent is subject to a terminal disclaimer.

[21] Appl. No.: 08/959,158

[22] Filed: Oct. 28, 1997

Related U.S. Application Data

[63] Continuation of application No. 08/233,568, Apr. 26, 1994, Pat. No. 5,689,693.

[51] Int. Cl.[6] ........................................ G06F 9/302
[52] U.S. Cl. ................................ 712/224; 712/224
[58] Field of Search .................... 395/565, 394; 364/787.01, 787.02, 787.03, 787.04; 712/224, 218; 708/710, 711, 712, 713

[56] References Cited

U.S. PATENT DOCUMENTS

| | | |
|---|---|---|
| 4,180,861 | 12/1979 | Armstrong . |
| 4,928,223 | 5/1990 | Dao et al. . |
| 4,940,908 | 7/1990 | Tran . |
| 5,095,458 | 3/1992 | Lynch et al. . |
| 5,129,067 | 7/1992 | Johnson . |
| 5,136,697 | 8/1992 | Johnson . |
| 5,155,816 | 10/1992 | Kohn . |
| 5,155,820 | 10/1992 | Gibson . |
| 5,206,828 | 4/1993 | Shah et al. . |
| 5,226,126 | 7/1993 | McFarland et al. . |
| 5,237,700 | 8/1993 | Johnson et al. . |
| 5,251,306 | 10/1993 | Tran . |
| 5,450,560 | 9/1995 | Bridges et al. . |

FOREIGN PATENT DOCUMENTS

| | | |
|---|---|---|
| 0 180 005 | 5/1986 | European Pat. Off. . |
| 0 332 845 | 9/1989 | European Pat. Off. . |
| 0381471 | 8/1990 | European Pat. Off. . |
| 0 533 337 | 3/1993 | European Pat. Off. . |
| 2281422 | 3/1995 | United Kingdom . |
| 93/20505 | 10/1993 | WIPO . |

OTHER PUBLICATIONS

D.W. Anderson, F.J. Sparacio, F.M. Tomasulo, "The IBM System/360 Model 91: Machine Philosophy and Instruction–Handling[1]", Chapter 18, Part 2 Regions of Computer Space, Section 3 Concurrency: Single–Processor System, IBM Journal, vol. 11, Jan. 1967, pp. 276–292.

(List continued on next page.)

*Primary Examiner*—Richard L. Ellis
*Attorney, Agent, or Firm*—Skjerven, Morrill, MacPherson, Franklin & Friel LLP; Ken J. Koestner

[57] ABSTRACT

A enable circuit (700), employing a "circular carry lookahead" technique to increase its speed performance, is provided for applying two pointers to a circular buffer—an enabling pointer (tail <3:0> (218)) and a disabling pointer (head <3:0> (216))—and for generating a multiple-bit enable, ENA (722) in accordance with the pointer values. The pointers designate enable bit boundaries for isolating enable bits of one logic level from enable bits of an opposite logic level. The enable circuit includes several lookahead cells (702, 704, 706 and 708) arranged in an hierarchical array, each of the cells including bits that continue the hierarchical significance. Each cell receives an hierarchical portion of the enabling pointer 218 and the disabling pointer head <3:0> and a carry. From these pointers, the cell derives a generate, a propagate and the enable bits with a corresponding hierarchical significance. The propagates, generates and carries for all of the lookahead cells are interconnected using a circular propagate carry circuit (710) that provides for asserting a carry to a lookahead cell unless an intervening cell having a nonasserted propagate is interposed in the order of hierarchical significance between the cell and a cell in which enablement is generated.

15 Claims, 11 Drawing Sheets

OTHER PUBLICATIONS

R.M. Tomasulo, An Efficient Algorithm for Exploiting Multiple Arithmetic Units[1], Part 2 Regions of Computer Space, Section 3 Concurrency: Single–Processor System, IBM Journal, vol. 11, Jan. 1967, pp. 293–305.

U.S. Application Serial No. 08/145,902 filed Oct. 29, 1993 entitled "Speculative Instruction Queue and Method Therefor Particularly Suitable for Variable Byte–Length Instructions"—David B. Witt, Attorney Docket M–2279 US.

U.S. Patent Application Serial No. 08/145,905 filed Oct. 29, 1993 entitled "Pre–Coded Instruction Cache and Method Therefor Particularly Suitable for Variable Byte–Length Instructions"—David B. Witt and Michael D. Goddard, Attorney Docket MS–2278 US.

U.S. Patent Application Serial No. 08/146382 filed Oct. 29, 1993 entitled "High Performance Superscalar Microprocessor"—David B. Witt and William M. Johnson, Attorney Docket M–2518 US.

U.S. Patent Application Serial No. 08/146,383 filed Oct. 29, 1993 entitled "Superscalar Instruction Decoder"—David B. Witt and Michael B. Goddard, Attorney Docket M–2280 US.

U.S. Patent Application Serial No. 08/233,567 filed Apr. 26, 1994 entitled "Dependency Checking and Forwarding of Variable Width Operands"—Gerald D. Zuraski, Jr., Scott A. White, Murali S. Chinnakonda, and David S. Christie, Attorney Docket M–2284 US.

U.S. Patent Application Serial No. 08/252,029 filed Jun. 1, 1994 entitled "Superscalar Microprocessor Including Flag Operand Renaming and Forwarding Apparatus"—Scott A. White, David S. Christie, and Michael D. Goddard, Attorney Docket M–2550 US.

U.S. Patent Application Serial No. 07/764,155 filed Sep. 20, 1991 entitled "Apparatus and Method for Resolving Dependencies Among a Plurality of Instructions within a Storage Device"—Thang M. Tran, Attorney Docket 203–639.

Mark Marshall, "Techniques for User Testing of the 68882", 1988 International Test Conference, pp. 942–947.

Brian Case, "AMD Unveils First Superscalar 29K Core", *Microprocessor Report*, Oct. 24, 1994, pp. 23–26.

Michael Slater, "AMD's K5 Designed to Outrun Pentium", *Microprocessor Report*, Oct. 24, 1994, pp. 1, 6–11.

Gurindar S. Sohi, "Instruction Issue Logic for High–Performance, Interruptible, Multiple Functional Unit, Pipelined Computers", IEEE Transaction on Computers, vol. 39, No. 3, ©1990, pp. 349–359.

Bruce D. Lightner and Gene Hill, "The Metaflow Lightning Chipset", IEEE Proceedings ConpCom Spring '91, Feb. 1991, pp. 13–18.

R.M. Tomasulo, An Efficient Algorithm for Exploiting Multiple Arithmetic Units, IBM Journal, Jan. 1967, vol. 11, pp. 25–32.

Toyohiko Yoshida, et al., "The Approach to Multiple Instruction Execution in the GMICRO/400 Processor", ©1991, pp. 185–195.

Kai Hwang, et al., "Computer Architecture and Parallel Procesing", ©1984,pp. 170–174.

A. Aharon, et al., "Verification of the IBM RISC System/6000 by a Dynamic Biased Pseudo–Random Test Program Generator", IBM Systems Journal, vol. 30, No. 4, 1991, pp. 527–538.

C. Bellon, et al., "Analysis of Experimental Results on Functional Testing and Diagnosis of Complex Circuits", 1988 International Test Conference, pp. 64–72.

FIG. 4

REGISTER FILE ARRAY 400

| BITS 8:7<br>BITS 6:3 | 00<br><31:0> | 01<br><40:0> | 10<br><40:0> | 11<br><40:0> |
|---|---|---|---|---|
| 0000 |  | EAX | — | (L) FP0 (H) |
| 0001 |  | ECX | — | (L) FP1 (H) |
| 0010 |  | EDX | — | (L) FP2 (H) |
| 0011 |  | EBX | — | (L) FP3 (H) |
| 0100 |  | ESP | — | (L) FP4 (H) |
| 0101 |  | EBP | — | (L) FP5 (H) |
| 0110 |  | ESI | — | (L) FP6 (H) |
| 0111 |  | EDI | — | (L) FP7 (H) |
| 1000 |  | ETMP0 | ETMP8 | (L) FTMP0 (H) |
| 1001 |  | ETMP1 | ETMP9 | (L) FTMP1 (H) |
| 1010 |  | ETMP2 | ETMP10 | (L) FTMP2 (H) |
| 1011 |  | ETMP3 | ETMP11 | (L) FTMP3 (H) |
| 1100 |  | ETMP4 | ETMP12 | (L) FTMP4 (H) |
| 1101 |  | ETMP5 | ETMP13 | (L) FTMP5 (H) |
| 1110 |  | ETMP6 | ETMP14 | (L) FTMP6 (H) |
| 1111 |  | ETMP7 | ETMP15 | (L) FTMP7 (H) |

<40:0>   <81:0>

RANGE FINDING CIRCUIT FOR SELECTING A CONSECUTIVE SEQUENCE OF REORDER BUFFER ENTRIES USING CIRCULAR CARRY LOOKAHEAD

This application is a continuation of application Ser. No. 08/233,568, filed Apr. 26, 1994 now U.S. Pat. No. 5,689,693.

RELATED PATENT APPLICATIONS

The present invention is related to subject matter which is disclosed in:

U.S. patent application Ser. No. 08/145,905 filed on Oct. 29, 1993 (David B. Witt and Michael D. Goddard, "Pre-Decode Instruction Cache and Method Therefor Particularly Suitable for Variable Byte-Length Instructions", abandoned).

U.S. patent application Ser. No. 08/145,902 filed on Oct. 29, 1993 (David B. Witt "Speculative Instruction Queue and Method Therefor Particularly Suitable for Variable Byte-Length Instructions", abandoned).

U.S. patent application Ser. No. 08/146,383 filed on Oct. 29, 1993 (David B. Witt and Michael D. Goddard "Superscalar Instruction Decoder", abandoned).

U.S. Pat. No. 5,136,697 (William M. Johnson "System for Reducing Delay for Execution Subsequent to Correctly Predicted Branch Instruction Using Fetch Information Stored with each Block of Instructions in Cache").

U.S. patent application Ser. No. 08/146,382 filed on Oct. 29, 1993 (David B. Witt and William M. Johnson, "High Performance Super-scalar Microprocessor," Attorney Docket No. M-2518, abandoned).

U.S. Pat. No. 5,590,352 (G. D. Zuraski Jr., S. A. White, M. S. Chinnakonda and D. S. Christie, "Dependency Checking and Forwarding of Variable Width Operands").

U.S. Pat. No. 5,632,023 (S. A. White, D. S. Christie and M. D. Goddard, "Superscalar Microprocessor including Flag Operand Renaming and Forwarding Apparatus").

BACKGROUND OF THE INVENTION

1. Field of the Invention

The present invention relates to a range-finding circuit, and more particularly to a range-finding circuit using carry lookahead cells arranged in a circular hierarchical order.

2. Description of the Related Art

Processors generally process a single instruction in several steps. Early technology processors performed these steps serially. Advances in technology have led to pipelined-architecture processors, which may be called scalar processors, which perform different steps of many instructions concurrently. A "superscalar" processor is implemented using a pipelined structure, but further improves performance by supporting concurrent execution of scalar instructions.

In a superscalar processor, instruction conflicts and dependency conditions arise in which an issued instruction cannot be executed because necessary data or resources are not available. For example, an issued instruction cannot execute when its input operands are dependent upon data calculated by other instructions that have not yet completed execution. One method for handling data dependencies uses a buffer to temporarily hold information identifying operands for which data is unavailable. The buffer checks for data dependencies by comparing input operands to all of the temporarily held operands.

Superscalar processor performance is improved by the speculative execution of instructions and by continuing to decode instructions regardless of the ability to execute instructions immediately. One technique for decoupling instruction execution from instruction decoding uses a buffer to temporarily hold information relating to instructions in a speculative state.

The buffer also improves the processor's performance of instruction sequences that include interspersed branch instructions. Branch instructions impair processor performance because instructions following the branch commonly must wait for a condition to become known before execution may proceed. A superscalar processor improves branching performance by "speculatively" issuing instructions, which involves predicting the outcome of a branch condition and proceeding with subsequent instructions in accordance with the prediction. The buffer is implemented to maintain the speculative state of the processor. When a misprediction occurs, the buffer is flushed.

In addition, various buffer implementations facilitate a processor's recovery from interrupts or traps arising from illegal instructions, preset trace operations, programmed stopping points, memory errors and other causes. The processor prepares for an interrupt or trap by storing manifestations of current conditions, processor state, and the address of the current instructions in the buffer. After completing a trap or interrupt routine, the processor returns to normal execution of the instruction stream, based on the stored data. Because interrupts and traps may occur at any point in an instruction sequence, the buffer must monitor the instruction stream to properly suspend and restart instruction execution.

One buffer, which may be called a reorder buffer, may furnish all of these functions. The performance requirements of the buffer are demanding and are increasingly burdensome as the number of buffer entries is expanded. For example, dependency checking requires that each input operand be compared to every reorder buffer entry and the comparison must be done in an instant. Furthermore, when a branch is mispredicted, the buffer must immediately identify buffer entries within the mispredicted branch path.

What is needed is a reorder buffer which quickly checks for data dependencies and buffer entries in a mispredicted branch path. What is needed is a dependency checking circuit for usage in a reorder buffer which instantaneously checks for data dependencies between one or more input operands and numerous unavailable and speculative operands. What is needed is a range-finding circuit for usage in reorder buffers and dependency checking circuits which immediately enables a range of bits identified by a two pointers.

SUMMARY OF THE INVENTION

The present invention advantageously controls allocation of entries in a buffer using two pointers, called a head and a tail. Pointers are controlled so that the buffer is flushed for recovery from traps and interrupts by simply adjusting one or both of the pointers. The pointers are useful in recovery from mispredicted branches as all buffer entries between the pointers are designated as cancelled when a branch is mispredicted so that results are ignored.

To quickly identify data dependencies and mispredicted branches, the present invention advantageously employs a range-finding circuit, which is a circuit that receives two pointers and generates a multiple bit output in which bits between the pointers are assigned one logic level and bits outside the pointers are assigned the opposite logic level.

The range-finding circuit, which is also called an "enable" circuit, identifies all of the entries of the circular queue between the head pointer and the tail pointer.

The present invention provides an improved range-finding circuit, which may also be called an enable circuit, that employs a "circular carry lookahead" technique to increase the speed performance of the range-finding operation.

A carry lookahead technique, which is similar to that employed in adder and incrementer circuits, is modified to provide an enable function. The circuit of the present invention does not perform an arithmetic function but does have basic carry propagation properties of an adder circuit. The enable circuit is modified from the lookahead adder so its structure is logically circular—there is no least significant bit, no most significant bit and no initial carry into the circuit. What is propagated between bits is not a carry function but is rather an enablement function.

In one embodiment, a range-finding circuit for receiving a first multiple-bit pointer and a second multiple-bit pointer and for generating a multiple-bit enable output in response to the pointers is disclosed. The pointers designate enable bit boundaries for isolating enable bits of one logic level from enable bits of an opposite logic level. The range-finding circuit includes several look-ahead cells arranged in an hierarchical array, each of the cells including bits that continue the hierarchical significance. Each cell receives an hierarchical portion of the first and second pointer bits and a carry bit. From these inputs, the cell derives a generate, a propagate and enable bits with a corresponding hierarchical significance.

The propagates, generates and carries for all of the lookahead cells are interconnected using a circular propagate carry circuit. The circular propagate carry circuit asserts a carry bit to a lookahead cell when all intervening cells, interposed in the order of circular hierarchical significance between the cell and a cell in which enablement is generated, have asserted propagate signals.

It is advantageous that the range-finding circuit of the present invention is implemented in logic circuits that do not require pass gates or direct pullup or pulldown transistors.

It is advantageous that the delay of the range-finding circuit of the present invention is fixed regardless of the positions of the applied head and tail pointers.

It is advantageous that the range-finding circuit of the present invention is expandable to increasing bit sizes with logarithmic speed degradation, rather than linear (or worse) speed degradation.

It is advantageous that the range-finding circuit of the present invention improves the speed performance of the reorder buffer and may be implemented in seven logic levels (for a sixteen entry reorder buffer) and used in a high frequency processor.

It is advantageous that most logic of the range-finding circuit of the present invention is NAND/NAND, which is very efficient for a CMOS implementation.

BRIEF DESCRIPTION OF THE DRAWINGS

The present invention may be better understood and its advantages, objects and features made better apparent by making reference to the following description, taken in conjunction with the accompanying drawings, wherein:

FIG. 4 is a pictorial representation illustrating a memory format in the register file shown in FIG. 1;

DETAILED DESCRIPTION OF THE PREFERRED EMBODIMENT

Figure 1:
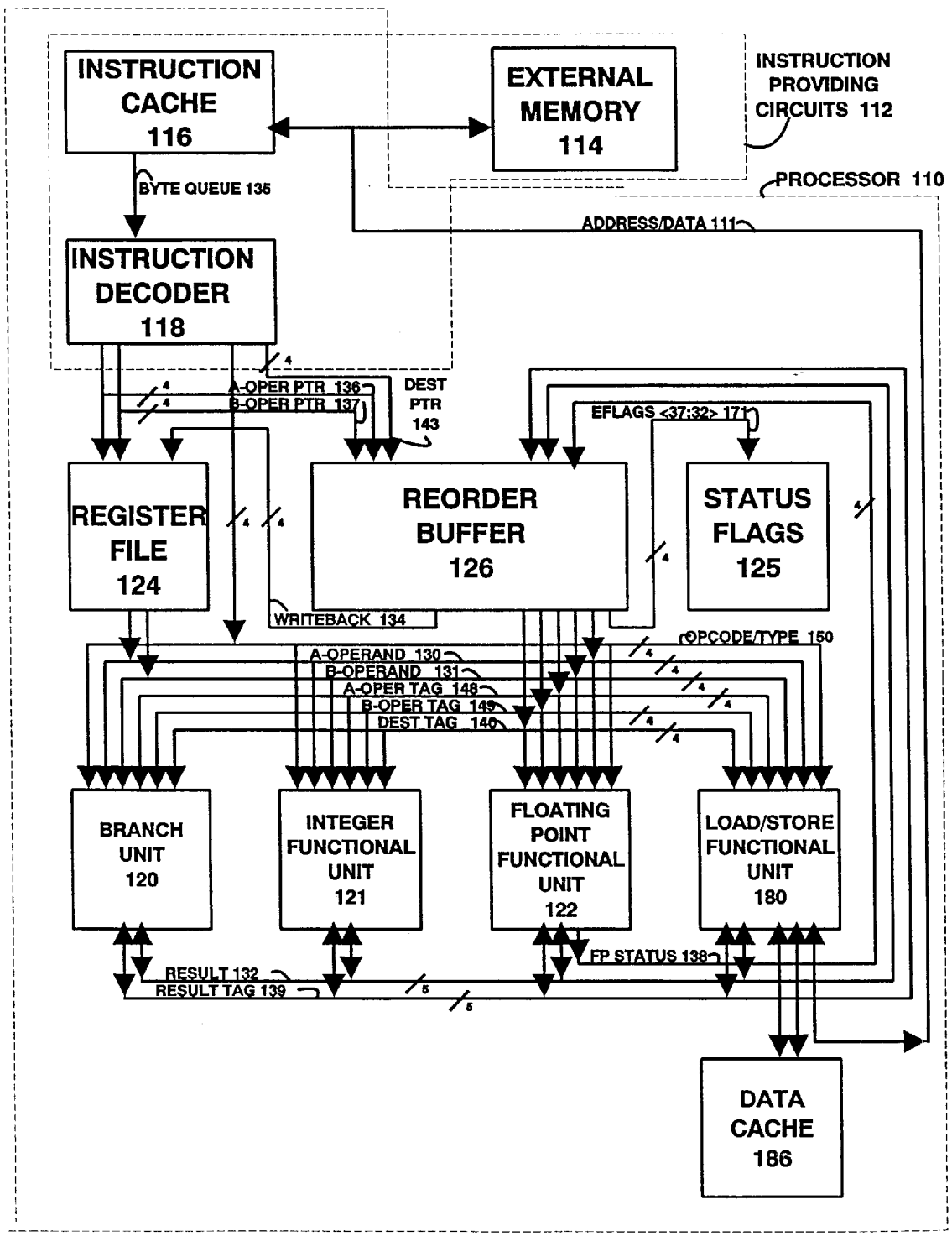
FIG. 1 is a architecture-level block diagram of a processor which uses a range-finding circuit.

A superscalar processor 110 which incorporates the range-finding circuit is shown in FIG. 1. The range-finding circuit may be employed in other processors.

An internal address and data bus 111 communicates address, data, and control transfers among various functional blocks of the processor 110 and an external memory 114. An instruction cache 116 parses and pre-decodes CISC instructions. A byte queue 135 transfers predecoded instructions to an instruction decoder 118, which maps the CISC instructions to respective sequences of instructions for RISC-like operations ("ROPs"). The instruction decoder 118 generates type, opcode, and operand pointer values for all ROPs based on the instructions in the byte queue 135.

An instruction cache is described in U.S. patent application Ser. No. 08/145,905 (David B. Witt and Michael D. Goddard, "Pre-Decode Instruction Cache and Method Therefor Particularly Suitable for Variable Byte-Length Instructions", Attorney Docket No. M-2278) now abandoned. A byte queue is described in U.S. patent application Ser. No. 08/145,902 (David B. Witt "Speculative Instruction Queue and Method Therefor Particularly Suitable for Variable Byte-Length Instructions", Attorney Docket No. M-2279) now abandoned. An instruction decoder is described in U.S. patent application Ser. No. 08/146,383 (David B. Witt and Michael D. Goddard "Superscalar Instruction Decoder", Attorney Docket No. M-2280) now abandoned. These applications, all filed on Oct. 29, 1993, are incorporated by reference in their entirety.

The instruction decoder 118 dispatches ROPs to processor 110 functional blocks over various busses. The processor 110 supports concurrent dispatch of up to four ROPs. Up to five ROP results are concurrently generated and up to sixteen speculatively executed ROPs are queued. Up to four sets of pointers to the A and B source operands and the destination operands are furnished over respective A-operand pointers 136, B-operand pointers 137 and destination pointers 143 by the instruction decoder 118 to a register file 124 and a reorder buffer 126. Register file 124 and reorder buffer 126 in turn furnish source operands A and B to various functional units on four pairs of A-operand busses 130 and B-operand busses 131. Associated with the A and B-operand busses 130 and 131 are operand tag busses, including four pairs of A-operand tag busses 148 and B-operand tag busses 149. When a result is unavailable, a tag that identifies the entry in the reorder buffer 126 to receive the result when it becomes available is loaded onto a corresponding operand tag bus. The four pairs of operand and operand tag busses correspond to four ROP dispatch positions. The instruction decoder, in cooperation with the reorder buffer 126, specifies four destination tag busses 140 identifying an entry in the reorder buffer 126 that receive results from the functional units. Functional units execute an ROP, copy the destination tag onto one of five result tag busses 139, and place a result on a corresponding one of five result busses 132 when the result is available. A functional unit directly accesses a result on result busses 132 when a corresponding tag on result tag busses 139 matches the operand tag of an ROP awaiting the result.

Instruction decoder 118 dispatches opcodes with A and B source operand information via four opcode/type busses 150. Opcode type busses 150 convey a control code to the functional units including an identifier of the RISC opcode and the ROP type which selects the appropriate functional unit.

Processor 110 includes several functional units, such as a branch unit 120, an integer functional unit 121, a floating point functional unit 122 and a load/store functional unit 180. Integer functional unit 121 is presented in a generic sense and represents units of various types, such as arithmetic logic units, shift units or a special registers unit. Branch unit 120 executes a branch instruction (ROP) and validates a branch prediction operation, a technique which allows an adequate instruction-fetch rate in the presence of branches and is used to achieve high performance with multiple instruction issue. A branch prediction system, including an instruction decoder and branch unit, is described in U.S. Pat. No. 5,136,697 (William M. Johnson "System for Reducing Delay for Execution Subsequent to Correctly Predicted Branch Instruction Using Fetch Information Stored with each Block of Instructions in Cache"), which is incorporated herein by reference in its entirety.

Processor 110 is shown in simplified form. Various combinations of functional units may be used in different embodiments. Each functional unit 120, 121, 122 and 180 has a respective reservation station (not shown) with inputs connected to operand busses 130 and 131, result busses 132 and opcode/type busses 150 to receive ROPs which are queued for execution by the functional units.

Register file 124 is a physical memory including mapped integer and floating point CISC registers, as well as temporary registers. Register file 124 is addressed by up to two register pointers of A and B-operand pointers 136 and 137 for each of up to four concurrently dispatched ROPs and furnishes values of selected entries onto A and B operand busses 130 and 131 through eight read ports. Register file 124 handles floating point and integer data with integers stored in 32-bit registers and floating point numbers stored in 82-bit registers that are retired to the register file 124 in pairs of 41-bit data segments. Register file 124 receives results of executed and nonspeculative operations from reorder buffer 126 over four writeback busses 134, in a process known as retiring results.

Reorder buffer 126 is a circular FIFO which tracks the relative order of speculatively executed ROPs. Its entries are dynamically allocated using head and tail queue pointers which respectively identify results to retire to the register file 124 and ROPs to enter on the FIFO queue. When an instruction is decoded, its ROP is allocated an entry in the reorder buffer 126 to store result data and control information. One field of the entry stores the result of an ROP execution when it becomes available. Another field stores an identifier of the destination register in the register file 124 which receives the result when the ROP is retired. For a subsequent operation having no dependencies, its A and B operand busses 130 and 131 are driven from the register file 124. However, when a subsequent operation has a dependency and refers to the renamed destination register to obtain the value considered to be stored therein, an entry is accessed within the reorder buffer 126. If a result is available therein, it is placed on the operand bus. If the result is unavailable, a tag identifying this reorder buffer entry is furnished on an operand tag bus of A and B-operand tag busses 148 and 149. The result or tag is furnished to the functional units over the operand busses 130, 131 or operand tag busses 148, 149, respectively. When results are obtained from completion of execution in the functional units 120, 121, 122 and 180, the results and their respective result tags are furnished to the reorder buffer 126, as well as to the reservation stations of the functional units, over five result busses 132 and result tag busses 139.

Functional unit results are communicated to reorder buffer 126 using five result busses 132 and five associated result tag and status busses 139. Of the five result and result tag and status busses, four are general purpose busses for forwarding integer and floating point results. Additional fifth result and result tag and status busses transfer control information from selected functional units to the reorder buffer. For example, status information arising from a load/store functional unit 180 store operation or from a branch unit 120 operation is placed on the additional busses, which are provided to conserve bandwidth of the four general purpose result busses. Functional units may be implemented to apply results and result tags to only a subset of the five result busses 132 and result tag busses 139, respectively.

Instruction decoder 118 dispatches ROPs "in-order" to the functional units. Reorder buffer 126 maintains this order. The functional units queue ROPs for issue when all previous ROPs in the queue have completed execution, all source operands are available via the operand or result busses, and a result bus is available to receive a result. Thus, functional units complete ROPs "out-of-order". The dispatch of operations does not depend on the completion of the operations so that, unless the processor is stalled by the unavailability of a reservation station queue or an unallocated reorder buffer entry, instruction decoder 118 continues instruction decoding regardless of whether instructions can be promptly completed.

Reorder buffer 126 also handles exceptions and mispredictions, and maintains the state of certain registers, including the program counter and the execution flags. A RISC core is disclosed in U.S. patent application Ser. No. 08/146,382 filed on Oct. 29, 1993 (David B. Witt and William M. Johnson, "High Performance Super-scalar Microprocessor," Attorney Docket No. M-2518) now abandoned, which is incorporated herein by reference in its entirety.

Figure 2:
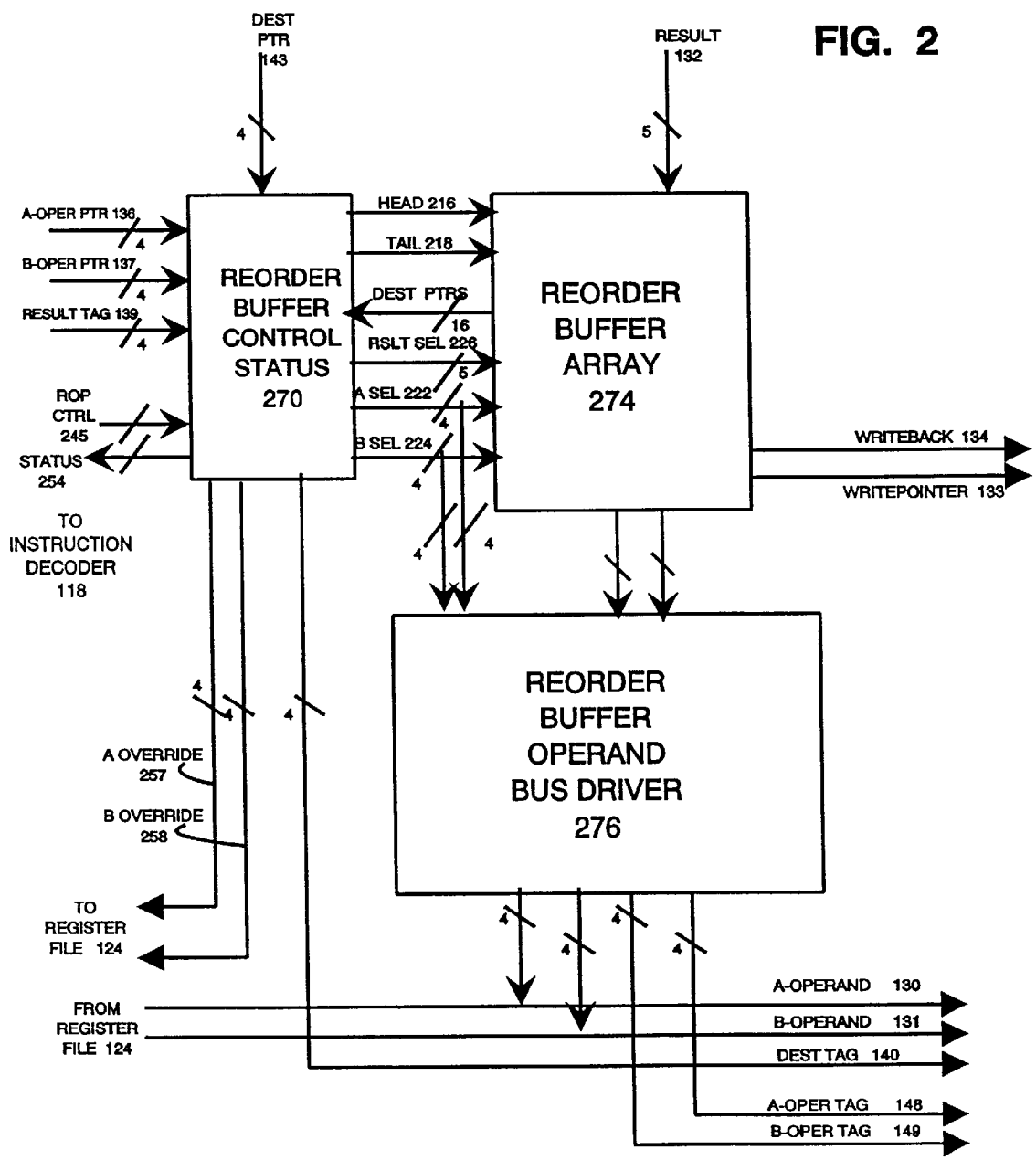
FIG. 2 is an architecture-level block diagram of a reorder buffer of the processor depicted in FIG. 1.

Referring to FIG. 2, reorder buffer 126 includes a reorder buffer (ROB) control and status block 270, a reorder buffer (ROB) array 274, and a reorder buffer (ROB) operand bus driver 276. ROB control and status block 270 is connected to the A and B-operand pointers 136 and 137 and the destination pointer busses 143 to receive inputs which identify source and destination operands for an ROP. ROB array 270 is connected to the result busses 132 to receive results from the functional units. Control signals, including a head pointer 216, a tail pointer 218, an A operand select 222, a B operand select 224 and a result select 226, are conveyed from ROB control and status 270 to ROB array 274. These control signals select ROB array elements that are written with result busses 132 data and read to writeback busses 134, write pointers 133, A and B-operand busses 130 and 131, and A and B-operand tag busses 148 and 149. Sixteen destination pointers 220 (DEST PTRS), one for each reorder buffer array element, are conveyed from ROB array 274 to ROB control and status 270 to check for data dependencies.

ROB array 274 is a memory array under the control of the ROB control and status block 270. As the instruction decoder 118 dispatches ROPs, it places pointers on the four destination pointer busses 143. ROB control status 270 then allocates an entry of ROB array 274 and writes the destination register pointer into the DEST PTR field of the allocated entry.

As operations are executed and results are placed on the result busses 132 by the functional units, ROB control and status 270 accesses pointers from the result tag busses 132 which designate the corresponding ROB array entries to receive data from the result busses 132. ROB control 270 directs writing from the result busses 132 to the ROB array 274 using five result select pointers 226.

Figure 3:
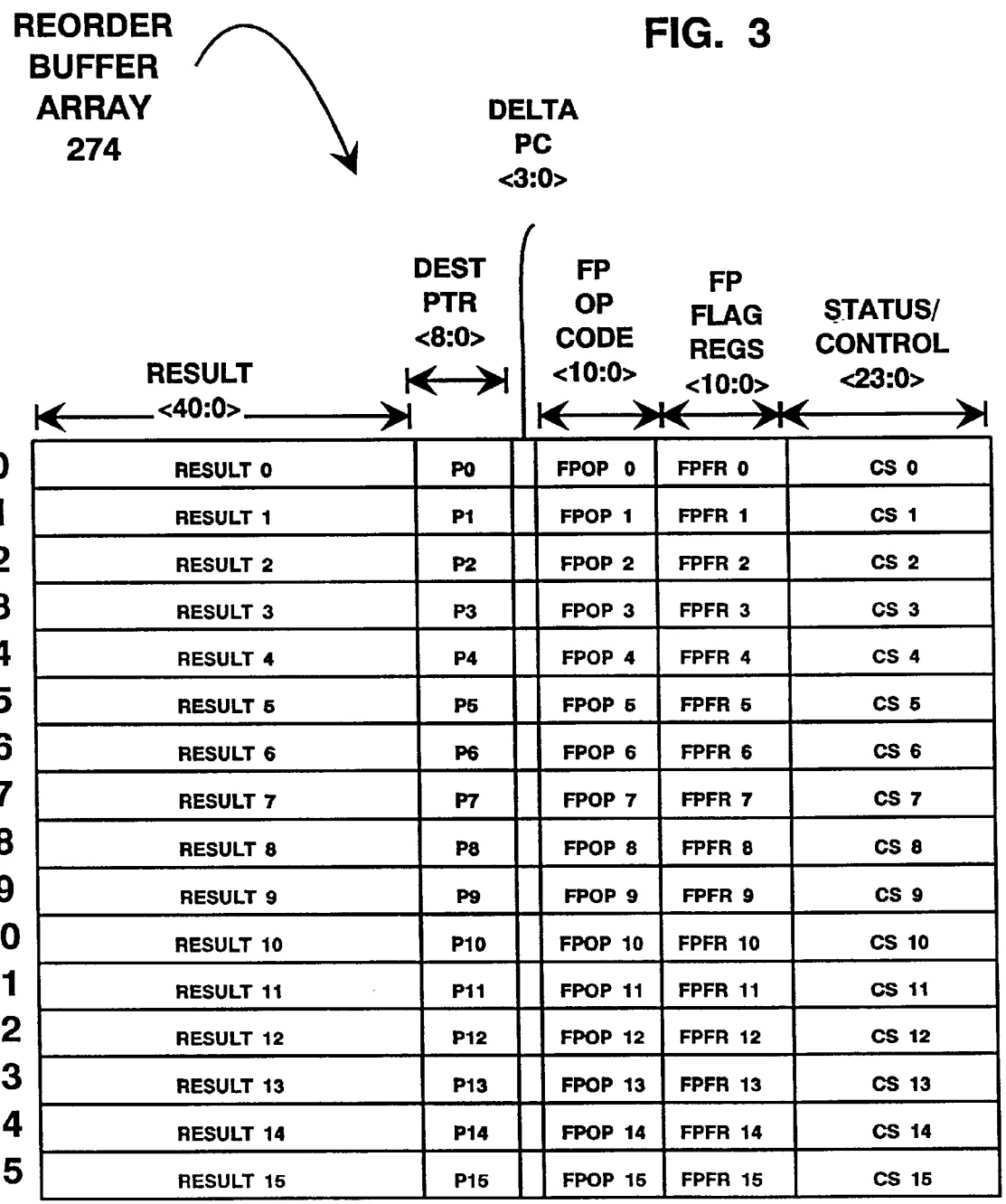
FIG. 3 is a pictorial representation illustrating a memory format within the reorder buffer of FIG. 2.

FIG. 3 is a pictorial illustration of an embodiment of a reorder buffer array 274 which includes sixteen entries, each of which includes a result field, a destination pointer field, a status/control field and other fields for storing control information. A 41-bit result field is furnished to store results received from the functional units. Two reorder buffer entries are used to store an 82-bit floating point result. Integer results are stored in 32 of the 41 bits of a single ROB entry and six of the remaining nine bits are used to hold status flags.

The destination pointer field (DEST PTR <8:0>) of each ROB array 274 entry designates a destination register in register file 124. ROB control and status 270 receives the source operand pointers and the destination operand pointer from instruction decoder 118 via, respectively, the A and B-operand pointers 136 and 137 and the destination pointer busses 143, and writes the destination pointer in the destination pointer (DEST PTR <8:0>) field of the ROB array 274. When an ROP is dispatched, reorder buffer 126 accomplishes dependency checking by simultaneously comparing the destination pointer (DEST PTR <8:0>) fields of all sixteen elements of reorder buffer array 274 to the A and B-operand pointers 136 and 137 to determine whether a match, which identifies a data dependency, exists.

When ROB control and status 270 detects a data dependency at dispatch, it overrides the reading of any operand in a register file array 62 entry which is data dependent by setting bits of an A operand override bus 257 and a B operand override bus 258 which are applied to the register file 124 to supply override signals for each operand bus. If ROB control and status 270 determines that a source operand is available in either register file 124 or reorder buffer 126, the source operand is placed on a bus of operand busses 130 or 131 for access by the functional units.

ROB control and status 270 retires an ROP by placing the result field of an ROB array 274 element on one of the writeback busses 134 and driving the write pointer 133 that corresponds to the writeback bus with the destination pointer. Thus write pointer 133 carries the destination pointer which designates the register number within register file 124 that is to receive the retired result. For writeback of integer data, low order 32 bits <31:0> of the result hold integer data, while high order bits <37:32> are status flags EFLAGS 271 which are used to update a status flags register 125. For floating point data, separate status busses 138 communicate flags to the reorder buffer 126, where the flags are stored until they are conveyed to a floating point status register (not shown) when the floating point ROP is retired.

FIG. 4 shows an exemplary register file array 262 with forty registers, including eight 32-bit integer registers (EAX, EBX, ECX, EDX, ESP, EBP, ESI and EDI), eight 82-bit floating point registers FP0 through FP7, sixteen 41-bit temporary integer registers ETMP0 through ETMP15 and eight 82-bit temporary floating point registers FTMP0 through FTMP7 which, in this embodiment, are mapped into the same physical register locations as the temporary integer registers ETMP0 through ETMP15.

Figure 5:
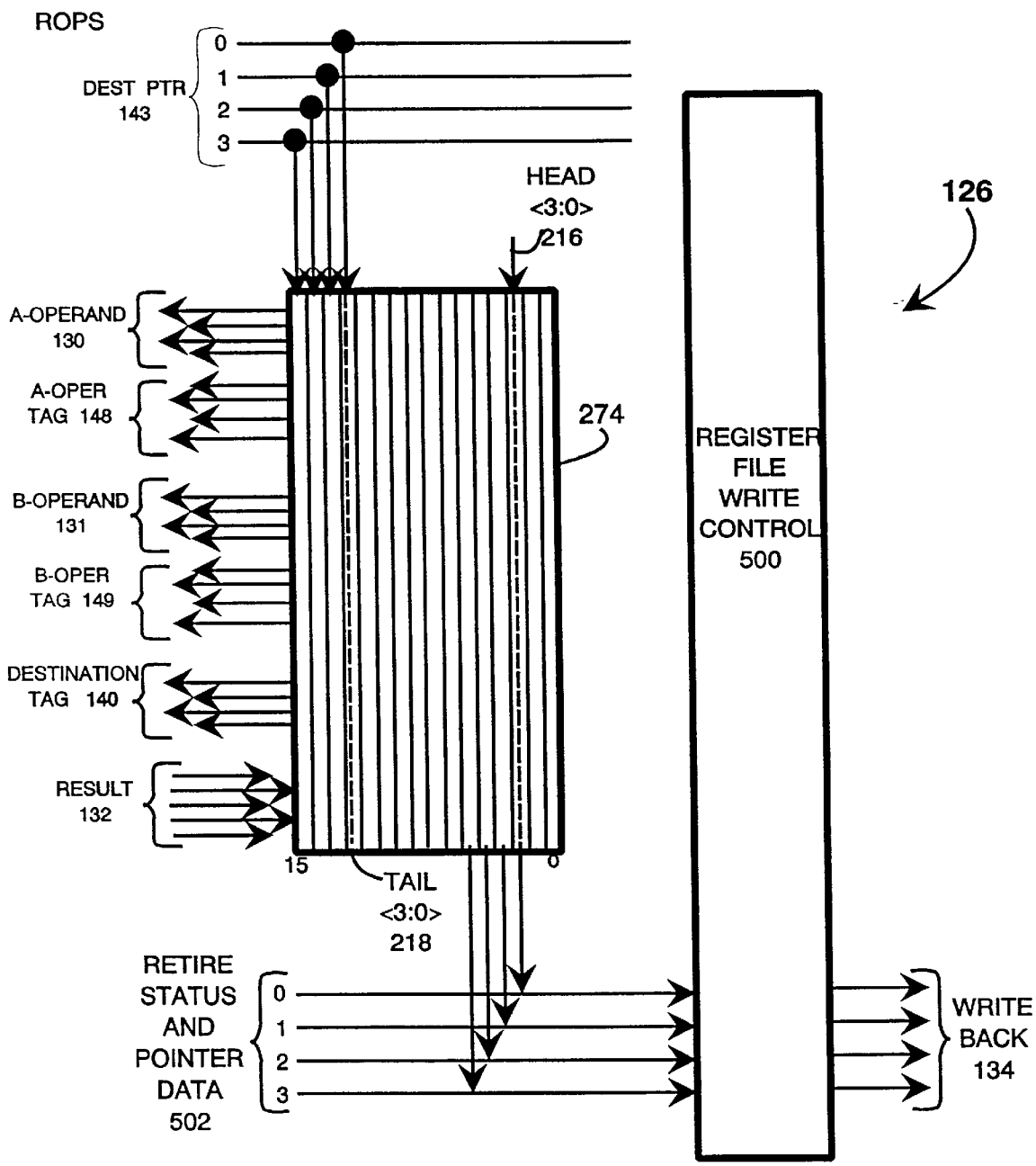
FIG. 5 is a schematic block diagram showing interconnections between the reorder buffer and register file of the processor illustrated in FIG. 1.

FIG. 5 is a schematic block diagram showing certain features of the reorder buffer 126 and their interconnections for allocating ROPs and retiring data. The reorder buffer array 274 receives inputs from the instruction decoder 118 to allocate up to four ROPs. The inputs include destination pointers via the destination pointer busses 143. Reorder buffer array 274 outputs are communicated to the functional units on A and B-operand busses 130 and 131, A and B-operand tag busses 148 and 149 and destination tag busses 140. Reorder buffer array 274 is also connected to the result busses 132 to receive result data.

The reorder buffer array 274 has sixteen entries and operates as a queue for handling speculative ROPs. Release and allocation of reorder buffer entries in the reorder buffer array 274 is managed using two pointers, respectively a head <3:0> pointer 216 and a tail <3:0> pointer 218, which are respectively incremented upon the release and allocation of an entry. The ROP entries of the reorder buffer array 274 between the head 216 and tail 218, including the head 216 entry but not the tail 218 entry, correspond to the ROPs in the processor's current speculative state. The head pointer 216 designates a first entry of the reorder buffer array 274, which functions as a FIFO circular buffer queue. The tail pointer 218 identifies the location after the last entry in the buffer. Thus, when the buffer is either empty or full, the head and tail pointers identify the same entry.

When instruction decoder 118 dispatches ROPs, entries starting with the tail 218 of the queue are allocated. For a particular ROP, the position of the allocated reorder buffer array 274 entry serves as a destination tag. The destination tag is placed on the destination tag busses 140 and driven at the corresponding ROP position to a functional unit along with the opcode of the ROP to be executed on the opcode/type busses 150. When a functional unit executes an ROP and generates a result, this result is placed on a bus of the result busses 132 for communication to the reorder buffer array 274. The destination tag of the ROP is placed on a bus of the result tag busses 139 by the functional unit to designate the reorder buffer array 274 entry to receive the result.

The destination pointer of an ROP identifies the register in the register file 124 that is to receive the result of the ROP when the ROP is retired. The number of the destination register is held in the destination pointer field of a reorder buffer array 274 entry. When subsequent ROPs are dispatched, their A and B-operand pointers are compared to all of the valid destination pointers held in the reorder buffer array 274. If the pointer values match, the result field of the most recently allocated entry of the ROB array 274 containing the matching destination pointer is driven on a bus of the A or B-operand busses 130 and 131 if the result is available. If the result is pending, a tag which identifies the reorder buffer array 274 entry is placed on a bus of the A or B-operand tag busses. Register renaming, the usage of multiple reorder buffer updates of the same register, is accomplished in this manner.

Data is retired from reorder buffer array 274 to the register file 124 on writeback busses 134 under control of a register file write control 500, which reads data from the reorder buffer array 274 via retire status and pointer data lines 502 and writes the data to register file 124 over writeback busses 134.

The queue tail <3:0> 218 points to the reorder buffer entry to be allocated to the next dispatched ROP. The queue head <3:0> 216 identifies the next ROP to retire. The relative position of entries in the ROB array 274 corresponds to the order of speculative program execution. To access a particular register that has entries corresponding to its renamed versions in the reorder buffer 126, the latest version is determined by the relative position of the most recently allocated corresponding renamed register in the ROB array 274. Reorder buffer 126 can update multiple renamed versions of any register in the register file 124 up to the total number of reorder buffer entries (sixteen).

The reorder buffer 126 also handles exceptions and traps that occur during speculative ROP execution. When a functional unit detects an exception or trap as it executes an ROP, it sends a code indicating the event on status bus 138. The code is held in the entry of the reorder buffer 126 allocated to the ROP; specifically, in the status/control <23:0> field. When an attempt is made to retire this result, notice of the exception is communicated from the reorder buffer 126 to the functional units over exception lines (not shown). The functional units respond to the exception by flushing their reservation stations. All speculative reorder buffer entries including the exception or trap are invalid. The speculative state is cleared in one clock cycle by replacing the tail <3:0> 218 pointer with the position of the ROP that realized the exception in the reorder buffer array 274. This frees the reorder buffer 126 to allocate entries to ROPs in the correct sequence that is fetched after the exception or trap is discovered.

In addition, the reorder buffer 126 handles data resulting from speculative ROP execution. For successfully predicted branches, the reorder buffer 126 entry allocated to the branch ROP holds the branch target program counter. For mispredicted branches, the reorder buffer 126 entry allocated to the branch ROP stores an indicator that the branch ROP is mispredicted. All speculative reorder buffer entries following a mispredicted branch are invalid. The reorder buffer 126 records this invalidity by setting a "cancel" bit in the reorder buffer array 274 status and control field <23:0> for each of the invalid entries. When the invalid entries are retired, their results are discarded and processor resources, such as the register file 124, are not updated. The reservation stations of the functional units are not flushed.

Figure 6:
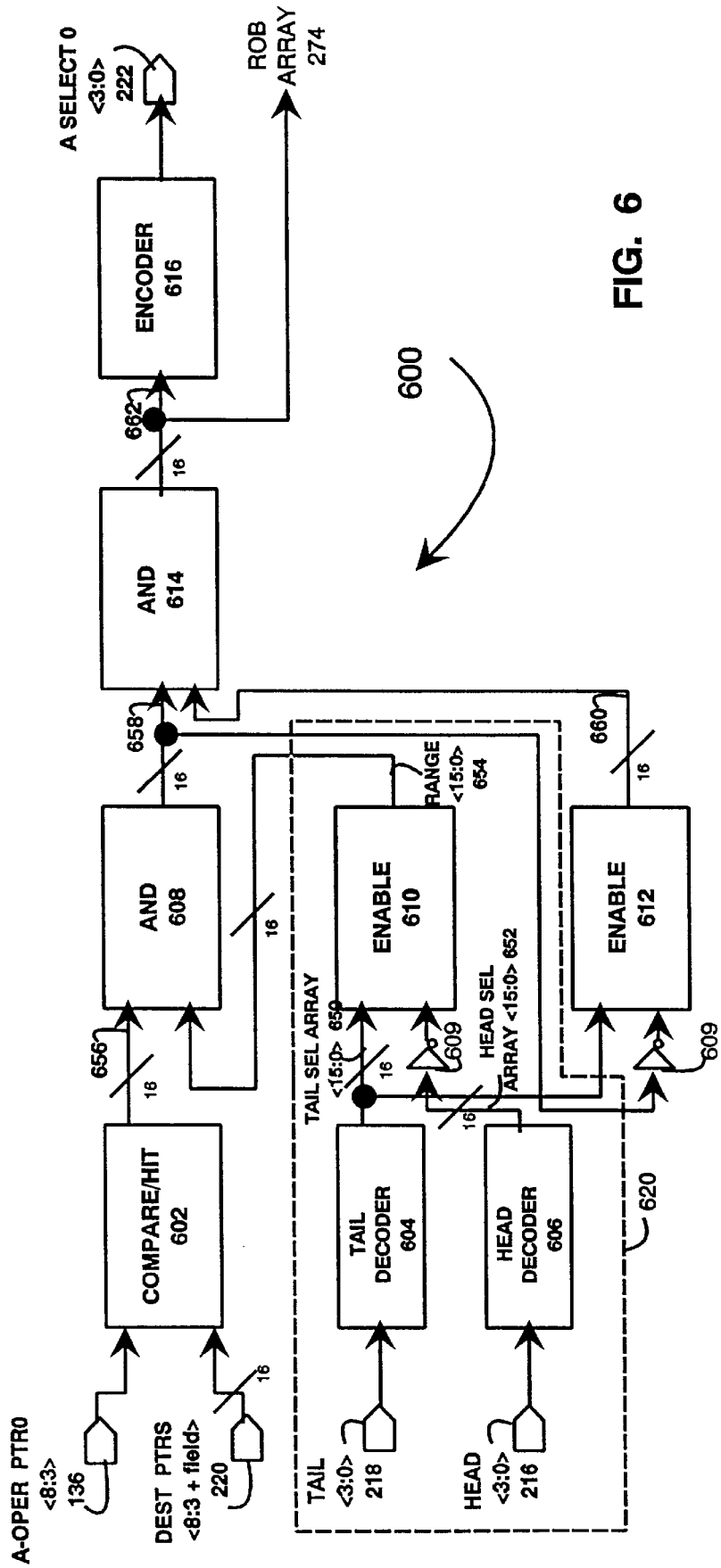
FIG. 6 is a schematic block diagram of dependency resolving block of the reorder buffer of FIG. 2.

FIG. 6 depicts a dependency logic circuit 600, which is connected to a particular one of the operand pointer busses, for example bus 0 of the A-operand pointer busses, and generates a 4-bit A operand select control signal 222 and provides sixteen select lines to the reader buffer array 274. The dependency logic circuit 600 is one of 27 such circuits (except as noted below) in one embodiment of the reorder buffer control status block 270. In this embodiment, each operand bus is partitioned into three data fields—a high-order field, a medium-order field and a low-order field corresponding respectively to bits <40:16>, <15:8> and <7:0> of the bus, as described in greater detail in U.S. Pat. No. 5,590,352 filed on even date herewith (G. D. Zuraski Jr., S. A. White, M. S. Chinnakonda and D. S. Christie, "Dependency Checking and Forwarding of Variable Width Operands", Attorney Docket No. M-2284), which is incorporated herein by reference in its entirety. Each of the data fields for each of the four A-operand busses 130 and for each of the four B-operand busses 131 are handled independently by 24 of the dependency logic circuits. In addition, flag registers are maintained in which six flags are associated into three logically-related groups, as is described in greater detail in U.S. Pat. No. 5,632,023 filed on even date herewith (S. A. White, D. S. Christie and M. D. Goddard, "Superscalar Microprocessor including Flag Operand Renaming and Forwarding Apparatus", Attorney Docket No. M-2550), which is incorporated herein by reference in its entirety. The three flag groups are renamable resources so that three additional dependency logic circuits are employed.

A compare/hit circuit 602 is connected to bits <8:3> of A-operand pointer 136 bus 0 to receive a pointer to the A-operand of an ROP that is dispatched by the instruction decoder 118. The compare/hit circuit 602 is also connected to selected bits of each of the sixteen destination pointer (DEST PTRS) lines 220, including bits <8:3> and one of the bits <2:0>, to receive all pointers to destination registers stored in the sixteen reorder buffer 126 entries. Bits <2:0> of the operand pointer identify the high, medium and low fields which are defined for a particular operand and are called field bits. Three dependency logic circuits 600 are connected to A-operand pointer 136 of bus 0. A first dependency logic circuit 600 detects dependencies in the high-order field and is connected to field bits <2> of the sixteen destination pointer lines 220. A second dependency logic circuit 600 detects dependencies in the medium-order field and is connected to field bits <1> of the sixteen destination pointer lines 220. A third dependency logic circuit 600 detects dependencies in the low-order field and is connected to field bits <0> the sixteen destination pointer lines 220.

The compare/hit circuit 602 tests the field bits of each of the sixteen destination pointers and compares the A-operand pointer 136 bus 0 bits <8:3> to each of the 16 destination pointer bits <8:3> to generate a 16-bit signal on compare-hit lines 656. A hit signal is generated for a particular destination pointer when the destination pointer field bit is 1 and bits <8:3> are the same as bits <8:3> of the operand. This identifies each reorder buffer entry for which the pointer of the destination operand is the same as the A-operand pointer 0. An asserted compare/hit indicates a potential data dependency. This is not an actual data dependency because a destination pointer may match but not correspond to an allocated reorder buffer entry.

A head select arrax <15:0> 652 is generated by passing the head <3:0> pointer 216 through a head decoder 606. The head <3:0> 216 is a pointer to the head of the reorder buffer FIFO, the next reorder buffer entry to be retired.

A tail select array <15:0> 650 is obtained by passing the tail <3:0> pointer 218 through a tail decoder 604. The tail <3:0> 218 is a pointer to the tail of the reorder buffer FIFO, as incremented by the number of the dispatch position with which the dependency logic circuit is associated (for example, 0 for dispatch position 0).

The tail select array <15:0> 650 and head select array <15:0> 652 as inverted by inverter 609 are applied to a first enable circuit 610 to generate a range <15:0> word 654 that identifies every entry of the reorder buffer between the tail <3:0> 218 and the head <3:0> 216, but not including the tail pointer position. The enable circuit 610 starts identifying bits at the next lower order position following the asserted bit of the tail select array <15:0> 650 and terminates identification at the asserted position of the head select array <15:0> 652. The range <15:0> 654 identifies entries that are allocated in the reorder buffer 126 and, thus, designates information concerning ROPs in the processor's current speculative state.

The tail decoder 604, head decoder 606 and enable circuit 610 are included in a shared circuit 620, which is shared among the high, medium and low-order fields of the A and B operands of each dispatch position so that six dependency logic circuits 600 use a single shared circuit 620.

An AND circuit 608 is connected to the sixteen compare-hit bits 656 and the range <15:0> bits 654. The AND circuit 608 performs a logical AND operation of its inputs and yields a 16-bit output on data dependency lines 658 that designates actual data dependencies. Actual data dependencies are dependencies upon ROPs that are currently in the processor's current speculative state. Thus, the range <15:0> bits 654 from enable circuit 610 are a mask that enables only the current speculative state dependency matches.

Data dependency lines 658 as inverted by inverter 611 and the tail select array <15:0> 650 are applied to a second enable circuit 612, which is identical to the first enable circuit 610. The second enable circuit 612 generates a 16-bit output on lines 660 which identifies every entry of the reorder buffer 126 between the tail select array <15:0> 650 and the actual data dependency pointer 658 that is closest to the tail of the reorder buffer queue. The result on line 660 is a mask which selects the latest operand dependency when multiple pointer hits occur. The data dependency lines 658 and lines 660 are connected to an AND block 614 to perform a logical AND operation of the two 16-bit values. The AND circuit supplies an output on lines 662 which contains fifteen logical zeros and one logical one. The position of the logical one designates the latest actual data dependency, nearest to the queue tail. The actual data dependency signal on line 662 is applied to an encoder 616 which encodes a pointer to the reorder buffer entry closest to the tail select array and places the encoded pointer on A operand select<3:0> 222, which corresponds to A operand bus 0.

TABLE I

| bit | tail 650 | head 652 | range 654 | hits 656 | deps 658 | mask 660 | selct 662 |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | 0 | 1 | 1 | 1 | 1 | 0 | 0 |
| 3 | 0 | 0 | 1 | 0 | 0 | 0 | 0 |
| 4 | 0 | 0 | 1 | 1 | 1 | 1 | 1 |
| 5 | 0 | 0 | 1 | 0 | 0 | 1 | 0 |
| 6 | 0 | 0 | 1 | 0 | 0 | 1 | 0 |
| 7 | 1 | 0 | 0 | 0 | 0 | 0 | 0 |
| 8 | 0 | 0 | 0 | 0 | 0 | 0 | 0 |
| 9 | 0 | 0 | 0 | 0 | 0 | 0 | 0 |
| 10 | 0 | 0 | 0 | 0 | 0 | 0 | 0 |
| 11 | 0 | 0 | 0 | 1 | 0 | 0 | 0 |
| 12 | 0 | 0 | 0 | 0 | 0 | 0 | 0 |
| 13 | 0 | 0 | 0 | 0 | 0 | 0 | 0 |
| 14 | 0 | 0 | 0 | 1 | 0 | 0 | 0 |
| 15 | 0 | 0 | 0 | 1 | 0 | 0 | 0 |

An example of the operation of the dependency logic circuit 600 is depicted in Table I with reference to FIG. 6. In this example, the tail pointer<3:0> 218 and the head pointer<3:0> 216 have the respective values of 7 and 2. The A operand pointer 0 designates a destination pointer that matches the destination pointers stored in the reorder buffer 126 entries 2, 4, 11, 14 and 15 to generate a "compare/hits" signal 656.

The head and tail pointers are decoded and the resulting head select array <15:0> 652 and tail select array <15:0> 650 are applied to the enable circuit 610, generating the range <15:0> word 654, in which bits 2 through 6 are asserted. The range <15:0> word 654 is ANDED with the compare/hits signal 656 by AND block 608 to designate the actual data dependencies of signal 658 in reorder buffer entries 2 and 4. The actual data dependencies signal 658 and the tail select array <15:0> 650 are applied to the enable circuit 612 to furnish the mask signal 660, which designates a mask range including reorder buffer entries 4 through 6. The mask signal 660 is ANDED with the actual data dependencies signal 658 to identify the data dependency closest to the queue tail, which is the select signal 662 designating the reorder buffer entry 4.

Figure 7:
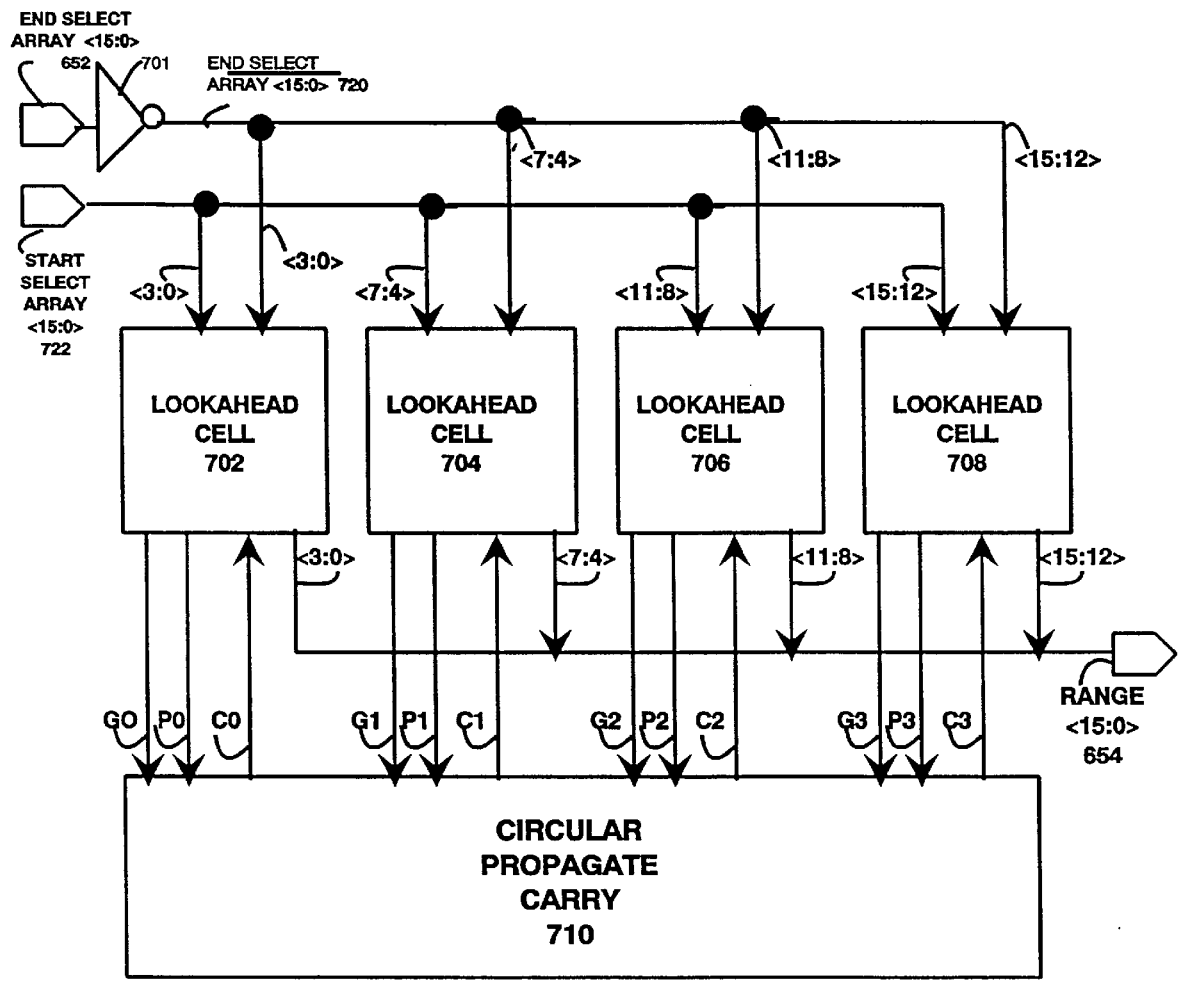
FIG. 7 is a schematic block diagram of range-finding circuit in the dependency resolving block.

FIG. 7 is a schematic block diagram of an enable circuit 700, which may be called a range-finding circuit. The enable circuit 700 implements the enable circuits 610 and 612 shown in FIG. 6.

Two inputs, the start select array <15:0> 722, which corresponds to the tail select array <15:0>, and an inverted end select array <15:0> 720, which corresponds to the inverted head select array <15:0>, are applied to the enable circuit 700. The enable circuit 700 includes a circular propagate carry circuit 710 and four lookahead cells 702, 704, 706 and 708, which receive four-bit portions of the start select array <15:0> 722 and the inverted end select array <15:0> 720.

The four 4-bit lookahead cells 702, 704, 706 and 708 are arranged in an array according to a hierarchical significance so that a low order cell 702 receives inverted end select array 720 bits <3:0> and start select array 722 bits <3:0> and a carry C0 and generates output bits <3:0> of the range word 654, a generate G0 and a propagate P0. A low-medium order cell 704 receives inverted end select array 720 bits <7:4> and start select array 722 bits <7:4> and a carry C1 and generates output bits <7:4> of the range word 654, a generate G1 and a propagate P1. A high-medium order cell 706 receives inverted end select array 720 bits <11:8> and start select array 722 bits <11:8> and a carry C2 and generates output bits <11:8> of the range word 654, a generate G2 and a propagate P2. A high order cell 708 receives inverted end select array 720 bits <15:12> and start select array 722 bits <15:12> and a carry C3 and generates output bits <15:12> of range <15:0> 654, a generate G3 and a propagate P3.

Generates $G_0$, $G_1$, $G_2$ and $G_3$ are furnished by cells 702, 704, 706 and 708, respectively. Generally the enable circuit 700 receives a start bit—the logical =b 1 =l bit of the start select array <15:0> 722, and an end bit=13 the closest lower order logical 0 bit of the inverted end select array <15:0> 720. The start select array <15:0> 722 is partitioned and applied to the lookahead cells 702, 704, 706 and 708 as start select array <3:0>, start select array <7:4>, start select array <11,8> and start select array <15,12>, respectively. The inverted end select array <15:0> 720 is partitioned and applied to the lookahead cells 702, 704, 706 and 708 as, respectively, end select array <3:0>, end select array <7:4>, end select array <11,8> and end select array <15,12>. A cell asserts a generate G if the start bit falls inside that cell, provided that the end bit does not also fall within the cell to terminate the range. Since the start bit only falls within one cell, one cell at most can assert a generate G at one time. The function G is called a generate because, if it is asserted, then a carry is generated for the next cell.

Figure 8:
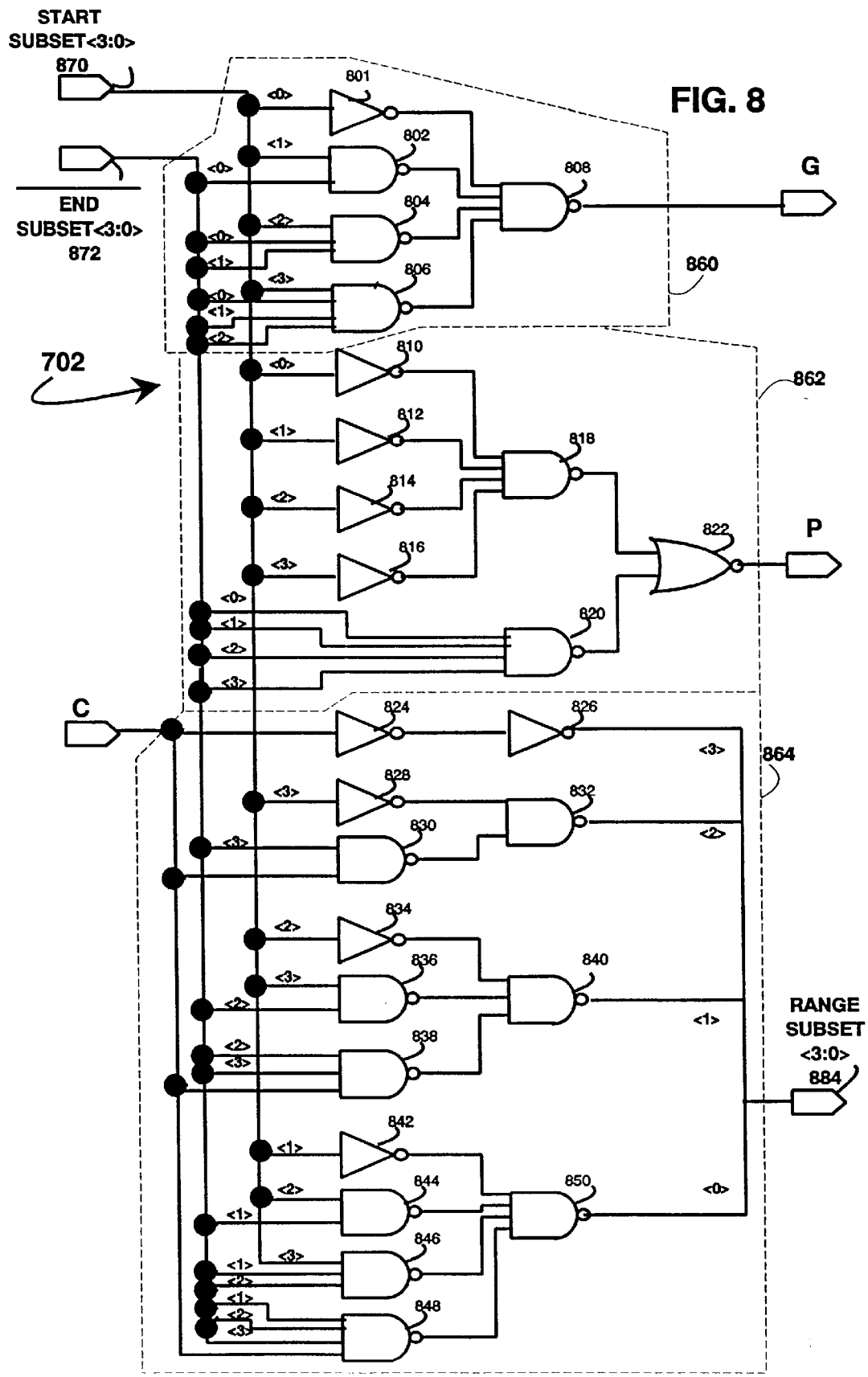
FIG. 8 depicts an electrical schematic diagram of a 4-bit carry lookahead cell of the range-finding circuit shown in FIG. 7.

FIG. 8 is an electrical schematic diagram of a 4-bit carry lookahead cell 702, which is identical to lookahead cells 704, 706 and 708 of the enable circuit 700 shown in FIG. 7. A start select array subset<3:0> 870 and inverted end select array subset<3:0> 872 deliver four-bit values to look-ahead cell 702. Lookahead cell 702 includes a generate circuit 860 including an inverter 801, NAND gates 802, 804 and 806 and a four-input NAND gate 808.

The generate circuit 860 implements a logic equation (1), as follows:

$$G = s\langle0\rangle + \overline{e\langle0\rangle}s\langle1\rangle + \overline{e\langle0\rangle e\langle1\rangle}s\langle2\rangle + \overline{e\langle0\rangle e\langle1\rangle e\langle2\rangle}s\langle3\rangle. \quad (1)$$

In this logic equation and others that follow, s<n>designates a start select array subset<3:0> 870 element, $\overline{e\langle n\rangle}$ designates an inverted end select array subset<3:0> 872 element, and "+" designates a logical "OR" operation. Similarly, parameters placed adjacent to one another designate a logical "AND" operation. An overbar designates an inverted bit.

According to the generate circuit 860 and the logic equation (1), the generate G is set within a lookahead cell if one of start select array subset 870 bits <0:3> is asserted (e.g. <3>), unless the end bit falls at a lower order position within the same group (e.g. <0>, <1> or <2>). In this case, range enablement starts and ends in the group and does not extend to other groups. NAND gates 802, 804 and 806 logically test for these conditions. NAND gate 808 enables the generate G when the condition tested by the NAND gates or the inverter 801 is valid.

The lookahead cell 702 also includes a propagate circuit 862 including inverters 810, 812, 814 and 816, four input NAND gates 818 and 820 and a two-input NOR gate 822. Start select array subset 870 bits <0>, <1>, <2> and <3> are applied, respectively, to inverters 810, 812, 814 and 816. The outputs of the inverters are applied to NAND gate 818. Inverted end select array subset 872 bits <0>, <1>, <2> and <3> are input to NAND gate 820. Outputs of NAND gates 818 and 820 are applied to NOR gate 822 to provide a propagate P.

Propagates $P_0$, $P_1$, $P_2$ and $P_3$ are furnished by cells 702, 704, 706 and 708, respectively. The function P is called a propagate because it expresses the condition that a carry is propagated out of a present cell and into the next cell. If a carry is passed into a cell it is propagated out of the cell provided the head pointer does not fall within the cell to terminate propagation. Simply stated, a cell asserts its propagate if neither the head pointer nor the tail pointer fall within the cell, as is determined by NAND gates 818 and 820. Thus, the propagate circuit 862 implements a logic equation (2), as follows:

$$P = \overline{s\langle0\rangle s\langle1\rangle s\langle2\rangle s\langle3\rangle} \cdot \overline{e\langle0\rangle e\langle1\rangle e\langle2\rangle e\langle3\rangle}. \quad (2)$$

Inverters 810, 812, 814 and 816 invert the start select array subset<3:0> 870 bits for testing by NAND gate 818. End select array 720 <3:0> bits are inverted prior to the propagate circuit. Thus, a generate Gi arising from lookahead cell i causes a carry at the ith cell. A propagate Pi causes an existing carry at the input to the ith cell to propagate to the next cell.

A lookahead cell 702 also includes a four-bit range circuit 864 including inverters 824, 828, 834, 842 and 826, two-input NAND gates 830, 836 and 844, three-input NAND gates 838 and 846, four-input NAND gate 848, and two, three and four input NAND gates 832, 840 and 850, respectively. A carry C is applied to the lookahead cell 702. In particular, referring to FIG. 7, carries $C_0$, $C_1$, $C_2$ and $C_3$ are applied to cells 702, 704, 706 and 708, respectively.

The range circuit 864 of each lookahead cell 702 receives the 4-bit inverted end select array subset<3:0> 872 and the 4-bit start select array subset<3:0> 870 bits and furnishes output range subset<3:0> bits 884. The bits within the range circuit 864 are arranged in an array according to a hierarchical significance that extends the hierarchical significance of the several lookahead cells 702, 704, 706 and 708. An asserted carry C into the cell enables assertion of each of the range subset<3:0> 884 output bits having a hierarchical significance equal to or greater than the hierarchical significance of the end bit, if any, in the end select array subset <3:0> 872. Likewise, an asserted start select array subset<3:0> 870 bit enables assertion of each of the range subset<3:0> 884 output bits that has a hierarchical significance lower than the start bit and equal to or greater than the hierarchical significance of the end bit, if any, in the end select array subset <3:0> 872. If neither the carry C into the cell nor a start select array subset<3:0> 870 bit enables assertion of a range subset bit, it is left unasserted.

Range circuit 864 implements logic equations (3), (4), (5) and (6), as follows:

$$EN\langle0\rangle = s\langle1\rangle + \overline{e\langle1\rangle}s\langle2\rangle + \overline{e\langle1\rangle e\langle2\rangle}s\langle3\rangle + \overline{e\langle1\rangle e\langle2\rangle e\langle3\rangle}C, \quad (3)$$

$$EN\langle1\rangle = s\langle2\rangle + \overline{e\langle2\rangle}s\langle3\rangle + \overline{e\langle2\rangle e\langle3\rangle}C, \quad (4)$$

$$EN\langle2\rangle = s\langle3\rangle + \overline{e\langle3\rangle}C, \quad (5)$$

$$EN\langle3\rangle = C. \quad (6)$$

Lookahead cells 702, 704, 706 and 708 mutually interact through the operations of circular propagate carry circuit 710, which receives generates G0, G1, G2 and G3 and propagates P0, P1, P2 and P3 from each cell in their order of hierarchical significance and produces carries C0, C1, C2 and C3 to the cells. The circular propagate carry circuit 710 connects the lookahead cells so that they are arranged in an array according to a circular hierarchical significance. The circular propagate carry circuit 710 propagates an asserted carry to a given cell unless another cell, which is interposed between the given cell and a cell that has the asserted generate G, fails to assert its propagate P.

Figure 9:
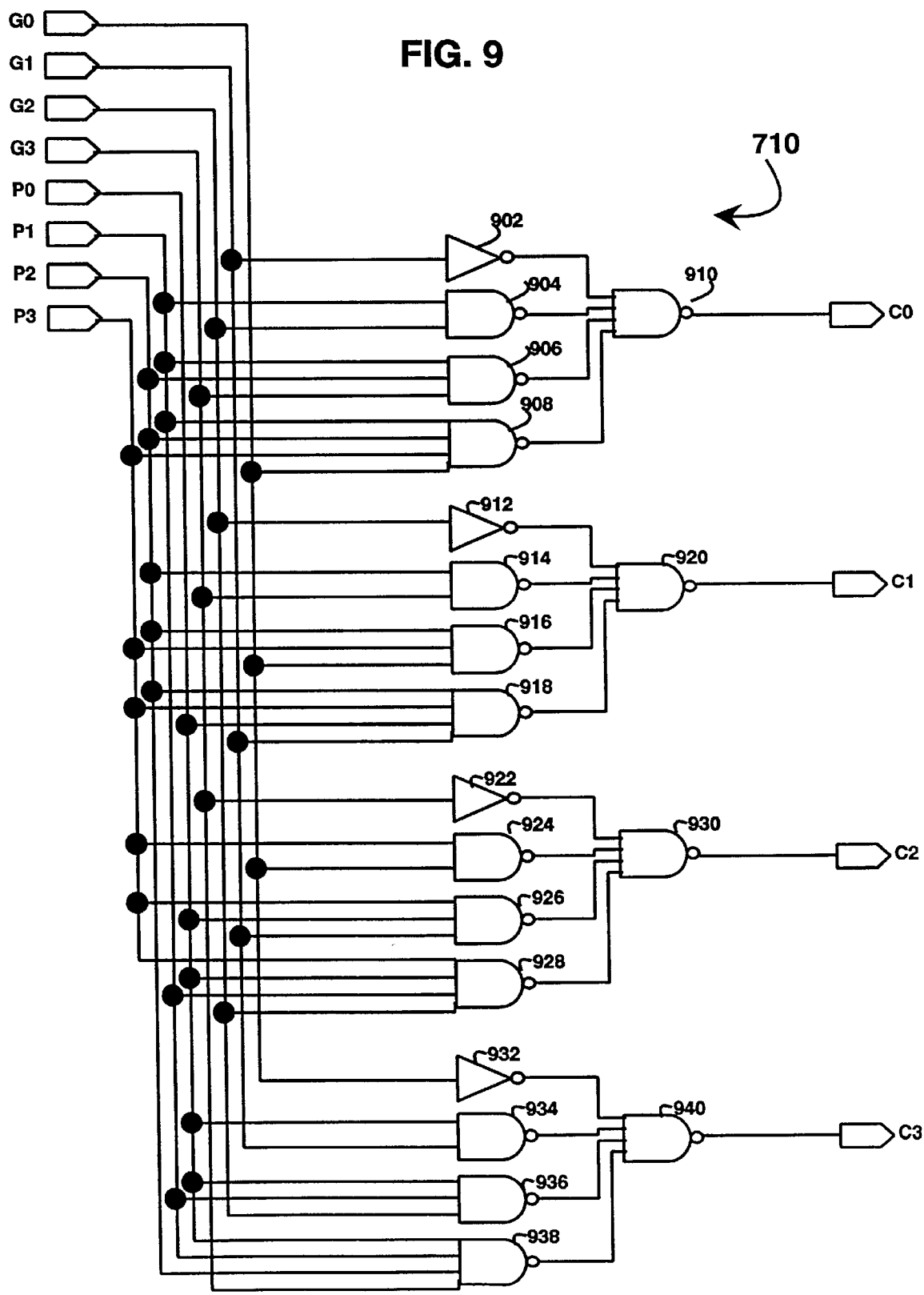
FIG. 9 illustrates an electrical schematic diagram of a circular carry circuit for connection with four 4-bit carry lookahead cells of FIG. 8 within the range-finding circuit shown in FIG. 7.

FIG. 9 depicts an electrical schematic diagram of the circular propagate carry circuit 710, which receives generates $G_0$, $G_1$, $G_2$ and $G_3$ and propagates $P_0$, $P_1$, $P_2$ and $P_3$ and furnishes an output of carries $C_0$, $C_1$, $C_2$ and $C_3$. The circular propagate carry circuit 710 implements logic equations (7), (8), (9) and (10), as follows:

$$C_0 = G_1 + P_1 G_2 + P_1 P_2 G_3 + P_1 P_2 P_3 G_0. \quad (7)$$

$$C_1 = G_2 + P_2 G_3 + P_2 P_3 G_0 + P_2 P_3 P_0 G_1. \quad (8)$$

$$C_2 = G_3 + P_3 G_0 + P_3 P_0 G_1 + P_3 P_0 P_1 G_2. \quad (9)$$

$$C_3 = G_0 + P_0 G_1 + P_0 P_1 G_2 + P_0 P_1 P_2 G_3. \quad (10)$$

Thus, for each lookahead cell N, the circular propagate carry circuit 710 asserts carry $C_N$ if any other lookahead cell has an asserted G and all cells intervening in the direction of increasing order have asserted Ps. Specifically, the carry $C_N$ is asserted if the previous lookahead cell N+1(modulo 4) has an asserted generate $G_{N+1}$. Inverters 902, 912, 922 and 932 in the circuit diagram of FIG. 9 generate carries in this manner. Similarly, NAND gates 904, 914, 924 and 934 set the carry $C_N$ if the once-removed previous lookahead cell N+2(modulo 4) has an asserted generate $G_{N+2}$ and the previous lookahead cell N+1 has an asserted propagate $P_{N+1}$. NAND gates 906, 916, 926 and 936 set the carry $C_N$ if the twice-removed previous lookahead cell N+3(modulo 4) has an asserted generate $G_{N+3}$ and the previous lookahead cells N+1 and N+2 have asserted propagates $P_{N+1}$ and $P_{N+2}$. Finally, the carry $C_N$ is set if the same lookahead cell $C_N$ has an asserted generate $G_N$ and the previous lookahead cells N+1, N+2 and N+3 have asserted propagates $P_{N+1}$, $P_{N+2}$ and $P_{N+3}$. NAND gates 908, 918, 928 and 938 in the circuit diagram of FIG. 9 produce this result.

Referring to FIGS. 7, 8 and 9 in combination, operation of the enable circuit 610 is exemplified as follows. What is desired, when the head pointer is =b 2 =1 and the tail pointer is 7, is that the range <15:0> 654 output has positions 2, 3, 4, 5 and 6 enabled and all other positions disabled. In the inverted version of head select array <15:0> 652, bit <2> is =b 0 =1 and all other bits <15:3> and <1:0> are 1. Tail select array <15:0> 650 bit <7> is 1 and all other tail select array 650 bits <15:8> and <6:0> are 0.

Lookahead cell 704 in enable circuit 610 is influenced by the tail select array 650 bit <7>, which corresponds to start select array subset 870 bit <3> and has the value 1. Tail select array subset 650 bit <7> is applied to the input of NAND gate 806 of generate circuit 860 along with head select array subset 652 bits <6:4>, all of which are 1 so that the generate G, which corresponds to generate G1, becomes 1 through NAND gate 808. Because no other bits of tail select array <15:0> 650 are 1, generates G0, G2 and G3 are all 0.

Also in lookahead cell 704, tail select array subset 650 bit <7> is applied to the input of inverter 816, causing the propagate P to be 0 through the operation of NAND gate 818 and NOR gate 822. This propagate P corresponds to propagate P1.

Lookahead cell 702 responds to the inverted head select array 652 bit <2>. Inverted end select array subset 872 bit <2> corresponds to it. The inverted head select array subset 652 bit <2>, which has the value 0, is applied at the input of NAND gate 820 of lookahead cell 702, forcing the propagate P, which corresponds to propagate P0, to 0. For lookahead cells 706 and 708, all inverted head select array subset 652 bits <15:12> and <11:8> are 1 and all tail select array subset 650 bits <15:12> and <11:8> are 0 so that propagates P2 and P3 are 1.

Thus G1, P2 and P3 are 1 and G0, G2, G3, P0 and P1 are 0. Generate G1 causes the carry C0 to become 1 via inverter 902 and NAND gate 910. Since generate G1 is 1, carry C1 becomes 1 only if all cells propagate the carry. Propagates P0 and P1 are 0 and thereby block the carry C1. Carries C2 and C3 become 1 only if propagate P0 is 1. Propagate P0 is 0 so carries C2 and C3 are 0.

Carry C0, which is 1, is applied to lookahead cell 702. However, range subset 884 bit <0> is forced to 0 by head select array subset 652 bit <2>, which is 0, applied to NAND gate 848. Similarly, range subset 884 bit <1> is forced to 0 by the head select array subset 652 bit <2>, which is 0, applied to NAND gate 838. Range subset 884 bit <2> becomes 1 due to carry C0 and inverted head select array 652 bit <3> via NAND gate 830 and NAND gate 832. Range subset 884 bit <3> becomes 1 by the carry C0 via inverters 824 and 826.

For lookahead cell 704, because tail select array 650 bit <7> alone is 1 and all inverted head select array 652 bits <7:4> are 1, range subset 654 bit <4> becomes 1 via NAND gate 846 and NAND gate 850, range 654 bit <5> becomes 1 through NAND gate 836 and NAND gate 840, and range 654 bit <6> becomes 1 via inverter 828 and NAND gate 832.

Range circuits 864 of lookahead cells 706 and 708 receive no carries and only the value 0 from tail select array 650 bits <15:12> and <11:7>, causing the range 654 bits <15:12> and <11:7> to have the value 0. Range subset 884 bits <2:0> from lookahead cell 704 correspond to range 654 bits <6:4>. Range subset 884 bits <3:2> from lookahead cell 702 correspond to range 654 bits <3:2>. Thus, range 654 bits <6:2> are =b 1 =1 while range 654 bits <15:7> and <1:0> are 0.

Figure 10:
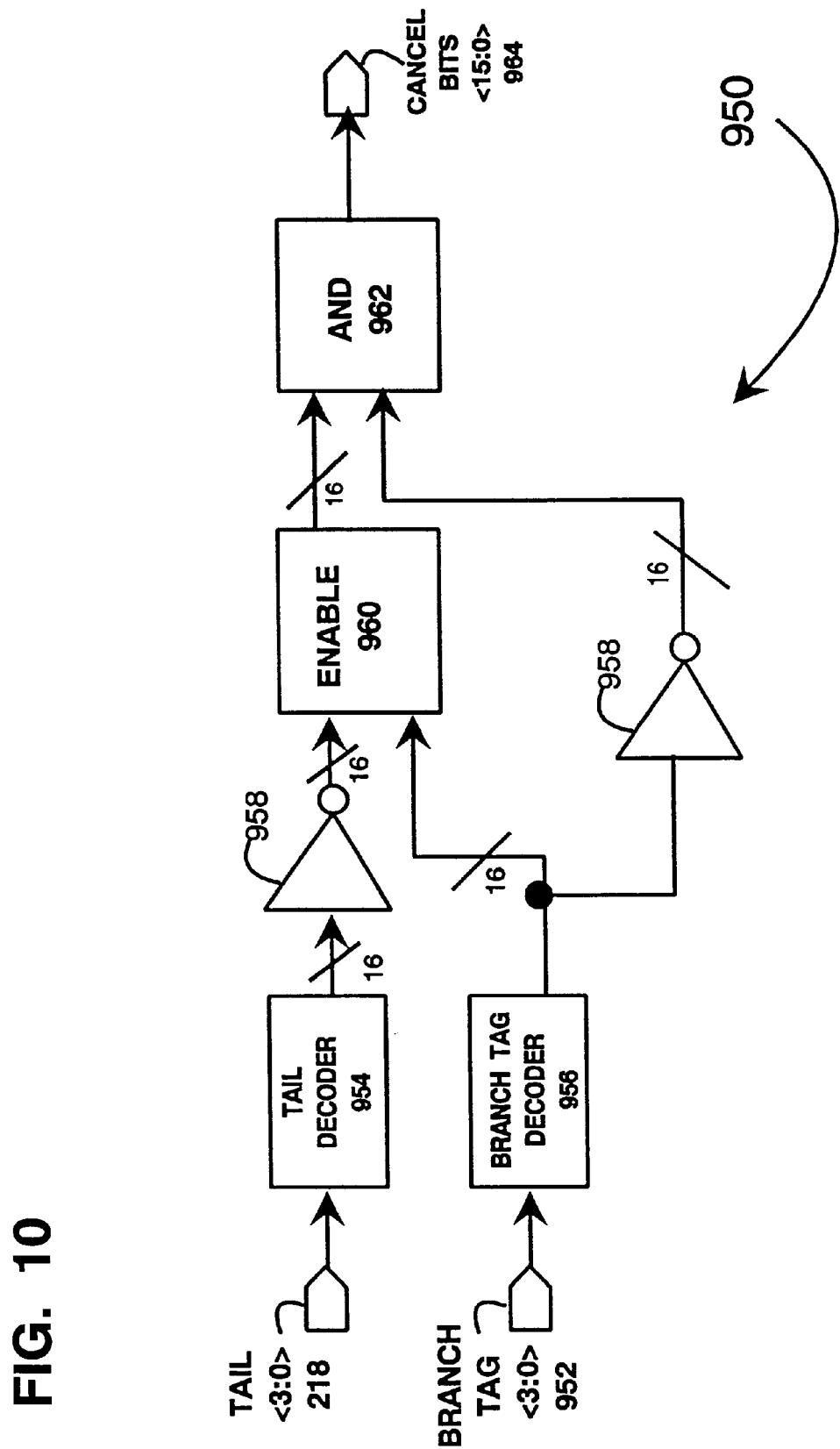
FIG. 10 is a schematic block diagram of branch misprediction cancel bit generator block of the reorder buffer of FIG. 2.

An enable circuit 700 is also used to cancel ROPs in a mispredicted branch path. FIG. 10 depicts a branch misprediction cancel bit generator block 950 within the reorder buffer control status block 270. Branch functional unit 120 determines whether a branch operation is predicted correctly or mispredicted. When the branch functional unit 120 detects a mispredicted branch, it drives a branch tag <3:0> 952 onto one of the result busses 132. The branch tag <3:0> 952 is the destination tag that corresponds to and identifies the reorder buffer entry holding the ROP of the branch instruction. The cancel bit generator 950 receives a four-bit branch tag <3:0> 952 and the tail <3:0> 218. The reorder buffer 126 applies the branch tag <3:0> 952 and the tail <3:0> 218 to 4:16 decoders branch tag decoder 956 and tail decoder 954, respectively. The bits from the decoders are applied to an enable circuit 960, which is the same as the enable circuits 610 and 612 of FIG. 6. The enable circuit 960 identifies all of the reorder buffer entry ROPs between the tail and the branch tag, including the branch tag but not including the queue tail. While the enable circuit 960 identifies all of the entries rendered invalid by the branch misprediction, it also includes the branch instruction, which should not be cancelled. To solve this problem, the decoded branch tag bits are inverted by inverter 958 and applied to AND circuit 962 in combination with the output of the enable circuit 960 to restore the branch entry. The inverted branch tag signal represents the branch instruction with a 0 and all of the reorder buffer entries other than the branch instruction with a 1, so that the output of the AND circuit 962 identifies all dispatched ROPs subsequent, in program order, to the mispredicted branch instruction.

Figure 11:
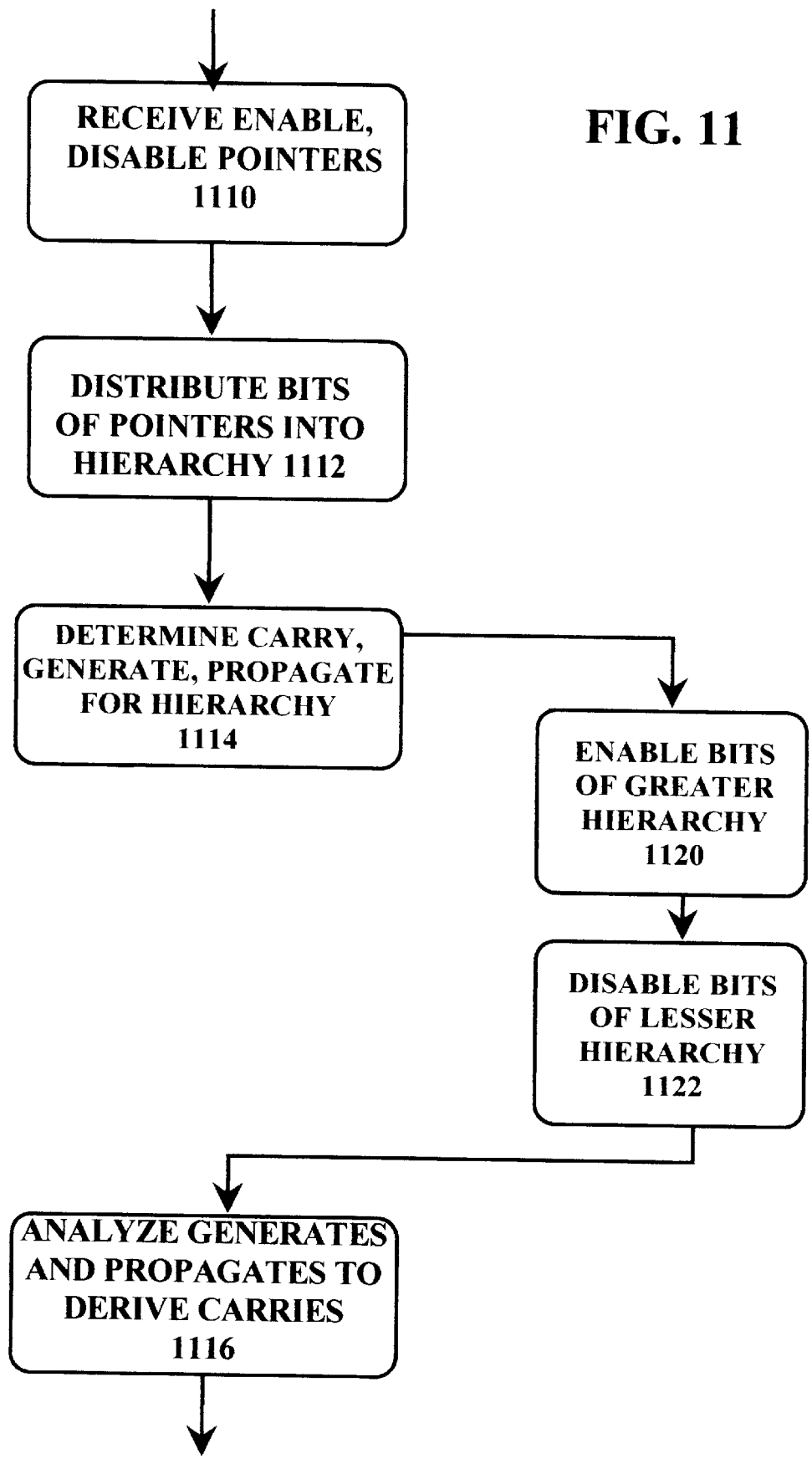
FIG. 11 is a flow chart that illustrates a method for assigning bit values to a multiple-bit range in accordance with an embodiment of the present invention.

Referring to FIG. 11, a flow chart illustrates a method for assigning bit values to a multiple-bit range including the steps of receiving 1110 a multiple-bit enabling pointer and a multiple-bit disabling pointer and distributing 1112 bits of the enabling and disabling pointers into a plurality of portions in an order of hierarchical significance. For each hierarchical portion of the enabling pointer and the disabling pointer, the pointers and a carry are used for determining 1114 a generate, a propagate and a carry for an hierarchical portion of the range. The carry, generate and propagate are signals of a plurality of respective carry, generate and propagate signals arranged according to the hierarchical significance. The plurality of generates and propagates are analyzed 1116 to determine carry signals for all portions of the pointers. The step of determining each hierarchical portion of the range includes the steps of enabling 1120 any range bits of the hierarchical portion having a hierarchical significance subsequent to the enabling pointer within the portion or a carry into the portion and having a hierarchical significance antecedent to the disabling pointer within the portion, if any, and disabling 1122 other range bits of the hierarchical portion.

It is to be understood that the scope of the present invention include other circuits that implement the logic equations (1) through (10) in various forms. Similarly, other range-finding circuits may be used that reverse the hierarchical significance of the illustrative embodiment, or provide pointers that bound the active and disabled regions inclusively or exclusively in various combinations. Other embodiments may include any suitable number of input and output bits. Furthermore, the number of bits in the lookahead cells may be increased or decreased. In addition to the CMOS logic described herein, the circular carry lookahead circuit advantageously facilitates an implementation in other logic technologies, such as standard cell or other "gates-only" design environments. These embodiments are also within the scope of the present disclosure. Accordingly, various other embodiments and modifications that are not described herein may be within the spirit and scope of the invention, as defined by the following claims.

What is claimed:

1. A range-finding circuit comprising:
    a plurality of cells arranged in a ordered array,
    a cell of the plurality of cells having a plurality of input connections coupled to a carry line, an ordered portion of bits of a first multiple-bit pointer, and an ordered portion of bits of a second multiple-bit pointer and
    a cell of the plurality of cells having a plurality of output connections coupled to a generate line, a propagate line, and an ordered portion of bits of a multiple-bit range corresponding to the ordered portions of first and second pointers,
    the carry line, the generate line, and the propagate line being respective elements of a plurality of ordered carry lines, generate lines, and propagate lines, and
    the pointers designating a range in which range bits between the pointers are assigned a first logic level and range bits outside the pointers are assigned a second opposite logic level; and
    a propagating circuit coupled to the plurality of cells and receiving the ordered generate lines and propagate lines and furnishing the ordered carry lines as a function thereof.

2. A circuit as in claim 1, wherein:
    a carry signal on the carry line into a cell assigns the logic level of the ordered portion of range bits of the cell subject to change by a pointer; and
    the pointer bits applied to the cell assign the logic level of the ordered portion of range bits starting at a bit designated by the pointer subject to change by the other pointer.

3. A circuit as in claim 1, wherein:
    a start designation of a bit of the first pointer bits applied to a cell asserts a generate signal on the generate line of the cell subject to change by the second pointer; and
    an end designation, subsequent in order to the start designation, of a bit of the second pointer bits applied to a cell disasserts the generate signal on the generate line of the cell.

4. A circuit as in claim 1, wherein a propagate signal on the propagate line of a cell is asserted by:
    a start designation of a bit of the first pointer bits applied outside the cell in combination with
    an end designation of a bit of the second pointer bits applied outside the cell.

5. A circuit as in claim 1, wherein the propagating circuit asserts a carry signal on the carry line into each cell having a cell of antecedent order with an asserted generate signal on the generate line and all intervening cells, if any, with asserted propagate signals on the propagate lines.

6. A circuit as in claim 1, wherein the plurality of cells and the multiple bits of the first pointer, the second pointer and the range are arranged in an array according to a circular order.

7. A circuit as in claim 1, wherein a cell of the plurality of cells is a four-bit cell, receiving a four-bit portion of the first and second pointers and providing an output signal including a four-bit portion of the range.

8. A circuit as in claim 7, wherein the number of cells is four and the number of bits in the first and second multiple-bit pointers and the range is sixteen.

9. A circuit as in claim 8, wherein the plurality of cells and the multiple bits of the first pointer, the second pointer and the range are arranged in an array according to a circular order.

10. A dependency logic circuit comprising:
    a compare/hit circuit coupled to an operand pointer and coupled to a plurality of destination pointers and destination signals, the compare/hit circuit for detecting an operand pointer that is equal to an asserted destination pointer signal;
    a range-finding circuit including:
        a plurality of cells arranged in a ordered array,
        a cell of the plurality of cells having a plurality of input connections coupled to a carry line, an ordered portion of bits of a first multiple-bit pointer, and an ordered portion of bits of a second multiple-bit pointer and
        a cell of the plurality of cells having a plurality of output connections coupled to a generate line, a propagate line, and an ordered portion of bits of a multiple-bit range corresponding to the ordered portions of first and second pointers,
        the carry line, the generate line, and the propagate line being respective elements of a plurality of ordered carry lines, generate lines, and propagate lines, and
        the pointers designating a range in which range bits between the pointers are assigned a first logic level and range bits outside the pointers are assigned a second opposite logic level; and
        a propagating circuit coupled to the plurality of cells and receiving the ordered generate lines and propagate lines and furnishing the ordered carry lines as a function thereof; and
    an AND circuit coupled to the compare/hit circuit and the range finding circuit, the AND circuit for detecting an operand pointer that is equal to an asserted destination pointer signal within the range designated by the range-finding circuit.

11. A dependency logic circuit according to claim 10, wherein the range finding circuit is a first range finding circuit and the AND circuit is a first AND circuit, the dependency logic circuit further comprising:
    a second range finding circuit having a cell of a plurality of cells with an input terminal coupled to an ordered portion of bits of one of the multiple-bit pointers applied to the first range finding circuit and coupled to an ordered portion of bits from the first AND circuit; and
    a second AND circuit coupled to the first AND circuit and the second range finding circuit, the second AND circuit for detecting an actual data dependency.

12. A processor comprising:
    a reorder buffer coupled to a storage, the reorder buffer storing a plurality of executable operations, the reorder buffer having a dependency logic circuit including:

a compare/hit circuit coupled to an operand pointer and coupled to a plurality of destination pointers and destination signals, the compare/hit circuit for detecting an operand pointer that is equal to an asserted destination pointer signal;

a range-finding circuit including:
a plurality of cells arranged in a ordered array,
a cell of the plurality of cells having a plurality of input connections coupled to a carry line, an ordered portion of bits of a first multiple-bit pointer, and an ordered portion of bits of a second multiple-bit pointer and
a cell of the plurality of cells having a plurality of output connections coupled to a generate line, a propagate line, and an ordered portion of bits of a multiple-bit range corresponding to the ordered portions of first and second pointers,
the carry line, the generate line, and the propagate line being respective elements of a plurality of ordered carry lines, generate lines, and propagate lines, and
the pointers designating a range in which range bits between the pointers are assigned a first logic level and range bits outside the pointers are assigned a second opposite logic level; and
a propagating circuit coupled to the plurality of cells and receiving the ordered generate lines and propagate lines and furnishing the ordered carry lines as a function thereof; and
an AND circuit coupled to the compare/hit circuit and the range finding circuit, the AND circuit for detecting an operand pointer that is equal to an asserted destination pointer signal within the range designated by the range-finding circuit; and a plurality of operation execution units coupled to the reorder buffer.

13. A processor according to claim 12, wherein the range finding circuit is a first range finding circuit and the AND circuit is a first AND circuit, the dependency logic circuit further comprising:
a second range finding circuit having a cell of a plurality of cells with an input terminal coupled to an ordered portion of bits of one of the multiple-bit pointers applied to the first range finding circuit and coupled to an ordered portion of bits from the first AND circuit; and
a second AND circuit coupled to the first AND circuit and the second range finding circuit, the second AND circuit for detecting an actual data dependency.

14. A processor according to claim 12, further comprising:
an instruction decoder coupled to the reorder buffer; and
an instruction cache coupled to the instruction decoder.

15. A computer system comprising:
a processor, the processor including a reorder buffer coupled to a storage, the reorder buffer storing a plurality of executable operations, the reorder buffer having a dependency logic circuit including:
a compare/hit circuit coupled to an operand pointer and coupled to a plurality of destination pointers and destination signals, the compare/hit circuit for detecting an operand pointer that is equal to an asserted destination pointer signal;
a range-finding circuit including:
a plurality of cells arranged in a ordered array,
a cell of the plurality of cells having a plurality of input connections coupled to a carry line, an ordered portion of bits of a first multiple-bit pointer, and an ordered portion of bits of a second multiple-bit pointer and
a cell of the plurality of cells having a plurality of output connections coupled to a generate line, a propagate line, and an ordered portion of bits of a multiple-bit range corresponding to the ordered portions of first and second pointers,
the carry line, the generate line, and the propagate line being respective elements of a plurality of ordered carry lines, generate lines, and propagate lines, and
the pointers designating a range in which range bits between the pointers are assigned a first logic level and range bits outside the pointers are assigned a second opposite logic level; and
a propagating circuit coupled to the plurality of cells and receiving the ordered generate lines and propagate lines and furnishing the ordered carry lines as a function thereof; and
an AND circuit coupled to the compare/hit circuit and the range finding circuit, the AND circuit for detecting an operand pointer that is equal to an asserted destination pointer signal within the range designated by the range-finding circuit; and
a plurality of operation execution units coupled to the reorder buffer;
an external storage external and coupled to the processor.

* * * * *